(12) United States Patent
Jiang et al.

(10) Patent No.: US 12,097,887 B2
(45) Date of Patent: Sep. 24, 2024

(54) OPEN SPACE PLANNER PROFILING TOOL FOR AUTONOMOUS VEHICLE

(71) Applicant: Baidu USA LLC, Sunnyvale, CA (US)

(72) Inventors: Shu Jiang, Sunnyvale, CA (US); Qi Luo, Sunnyvale, CA (US); Yu Cao, Sunnyvale, CA (US); Weiman Lin, Sunnyvale, CA (US); Yu Wang, Sunnyvale, CA (US); Hongyi Sun, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 376 days.

(21) Appl. No.: 17/398,359

(22) Filed: Aug. 10, 2021

(65) Prior Publication Data
US 2023/0046149 A1 Feb. 16, 2023

(51) Int. Cl.
*B60W 60/00* (2020.01)
*B60W 50/04* (2006.01)
*B60W 50/00* (2006.01)

(52) U.S. Cl.
CPC ...... *B60W 60/0025* (2020.02); *B60W 50/045* (2013.01); *B60W 2050/0083* (2013.01);
(Continued)

(58) Field of Classification Search
CPC .......... B60W 60/001; B60W 60/0027; B60W 60/00272; B60W 60/00274; B60W 60/00276; B60W 50/045; B60W 50/0097; B60W 2050/046; B60W 2050/0028; B60W 2050/0031; B60W 2050/0037; B60W 2050/0062; B60W 2050/0075; B60W 2050/0082; B60W 2050/0083;
(Continued)

(56) References Cited

U.S. PATENT DOCUMENTS

2020/0234512 A1* 7/2020 Lourakis ................. H04L 67/12
2020/0334570 A1* 10/2020 Franklin ............... G06F 16/904
(Continued)

OTHER PUBLICATIONS

Wang et al., A review of the Self-Adaptive Traffic Signal Control System Based on Future Traffic Environment, Jun. 27, 2018, Journal of Advanced Transportation, vol. 2018 (Year: 2018).*

*Primary Examiner* — Russell Frejd
*Assistant Examiner* — Sara J Lewandroski
(74) *Attorney, Agent, or Firm* — WOMBLE BOND DICKINSON (US) LLP

(57) ABSTRACT

According to various embodiments, systems, methods, and media for evaluating an open space planner in an autonomous vehicle are disclosed. In one embodiment, an exemplary method includes receiving, at a profiling application, a record file recorded by the ADV while driving in an open space using the open space planner, and a configuration file specifying parameters of the ADV; extracting planning messages and prediction messages from the record file, each extracted message being associated with the open space planner. The method further includes generating features from the planning message and the prediction messages in view of the specified parameters of the ADV; and calculating statistical metrics from the features. The statistical metrics are then provided to an automatic tuning framework for tuning the open space planner.

20 Claims, 11 Drawing Sheets

(52) U.S. Cl.
CPC ..... *B60W 2510/20* (2013.01); *B60W 2556/45* (2020.02); *B60W 2720/10* (2013.01)

(58) Field of Classification Search
CPC . B60W 2050/0085; B60W 2050/0087; B60W 2050/0088; B60W 2050/009; B60W 2050/0091; B60W 2050/0093; B60W 2050/0094; B60W 2050/0095; B60W 2556/46; B60W 2556/50; B60W 40/00; B60W 40/06; B60W 40/072; B60W 40/10; B60W 40/105
See application file for complete search history.

(56) References Cited

U.S. PATENT DOCUMENTS

2020/0406906 A1* 12/2020 Omari ................. G05D 1/0223
2022/0055641 A1* 2/2022 Wolff .................... G06N 20/00

* cited by examiner

| Category | Metric | Variables |
|---|---|---|
| Latency 701 | Chosen trajectory latency | $t_{e2e,max}, \overline{t_{e2e}}, \sigma t_{e2e}, PT95t_{e2e}$ |
| | Zig-zag trajectory latency | $t_{provider,max}, \overline{t_{provider}}, \sigma t_{provider}, PT95t_{provider}$ |
| | Stage completed time | $t_{stage}$ |
| Controllability 703 | Non-gear-switch trajectory length ratio | $C_d, \gamma_{d,max}, \overline{\gamma_d}, \sigma\gamma_d, PT95\gamma_d$ |
| | Initial heading difference ratio | $\gamma_{\Delta\theta_{init}}$ |
| | Normalized curvature ratio | $C_\kappa, \gamma_{\kappa,max}, \overline{\gamma_\kappa}, \sigma\gamma_\kappa, PT95\gamma_\kappa$ |
| | Curvature changing rate ratio | $C_{\dot{\kappa}}, \gamma_{\dot{\kappa},max}, \overline{\gamma_{\dot{\kappa}}}, \sigma\gamma_{\dot{\kappa}}, PT95\gamma_{\dot{\kappa}}$ |
| Comfort 705 | Acceleration ratio | $C_{acc}, \gamma_{acc,max}, \overline{\gamma_{acc}}, \sigma\gamma_{acc}, PT95\gamma_{acc}$ |
| | Deceleration ratio | $C_{dec}, \gamma_{dec,max}, \overline{\gamma_{dec}}, \sigma\gamma_{dec}, PT95\gamma_{dec}$ |
| | Longitudinal jerk ratio | $C_{j_{lon}}, \gamma_{j_{lon},max}, \overline{\gamma_{j_{lon}}}, \sigma\gamma_{j_{lon}}, PT95\gamma_{j_{lon}}$ |
| | Lateral jerk ratio | $C_{j_{lat}}, \gamma_{j_{lat},max}, \overline{\gamma_{j_{lat}}}, \sigma\gamma_{j_{lat}}, PT95\gamma_{j_{lat}}$ |
| | Longitudinal acceleration ratio | $C_{lon\_acc}, \gamma_{lon\_acc,max}, \overline{\gamma_{lon\_acc}}, \sigma\gamma_{lon\_acc}, TP95\gamma_{acc_{lon}}$ |
| | Lateral acceleration ratio | $C_{lat\_acc}, \gamma_{lat\_acc,max}, \overline{\gamma_{lat\_acc}}, \sigma\gamma_{lat\_acc}, TP95\gamma_{acc_{lat}}$ |
| | Longitudinal deceleration ratio | $C_{lon\_dec}, \gamma_{lon\_dec,max}, \overline{\gamma_{lon\_dec}}, \sigma\gamma_{lon\_dec}, TP95\gamma_{dec_{lon}}$ |
| | Lateral deceleration ratio | $C_{lat\_dec}, \gamma_{lat\_dec,max}, \overline{\gamma_{lat\_dec}}, \sigma\gamma_{lat\_dec}, TP95\gamma_{dec_{lat}}$ |
| Safety 707 | Distance to boundaries ratio | $C_{d_b}, \gamma_{d_b,max}, \overline{\gamma_{d_b}}, \sigma\gamma_{d_b}, TP95\gamma_{d_b}$ |
| | Distance to obstacles ratio | $C_{d_o}, \gamma_{d_o,max}, \overline{\gamma_{d_o}}, \sigma\gamma_{d_o}, TP95\gamma_{d_o}$ |
| | Time to collision ratio | $C_{TTC}, \gamma_{TTC,max}, \overline{\gamma_{TTC}}, \sigma\gamma_{TTC}, TP95\gamma_{TTC}$ |

FIG. 7

OPEN SPACE PLANNER PROFILING TOOL FOR AUTONOMOUS VEHICLE

TECHNICAL FIELD

Embodiments of the present disclosure relate generally to operating autonomous vehicles. More particularly, embodiments of the disclosure relate to evaluating and tuning an open space planner for an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Trajectories are usually planned based on traffic lanes which are pre-labeled within a high-definition (HD) map. However, this process does not apply to certain applicable scenarios, for example, in an open space where no traffic lanes are available, e.g., in a parking lot. In such application scenarios, an open space planner can be activated to operate an autonomous driving vehicle. An open space planner can be a separate autonomous driving module in an autonomous driving vehicle, and needs to be carefully tuned before being putting into use. Thus, an open space planner needs to be evaluated, and the evaluation result can be used for the automatic tuning of the open space planner.

BRIEF DESCRIPTION OF THE DRAWINGS

Embodiments of the disclosure are illustrated by way of example and not limitation in the figures of the accompanying drawings in which like references indicate similar elements.

FIG. 7 illustrates selected features in each of the four areas according to one embodiment.

DETAILED DESCRIPTION

Figure 1:
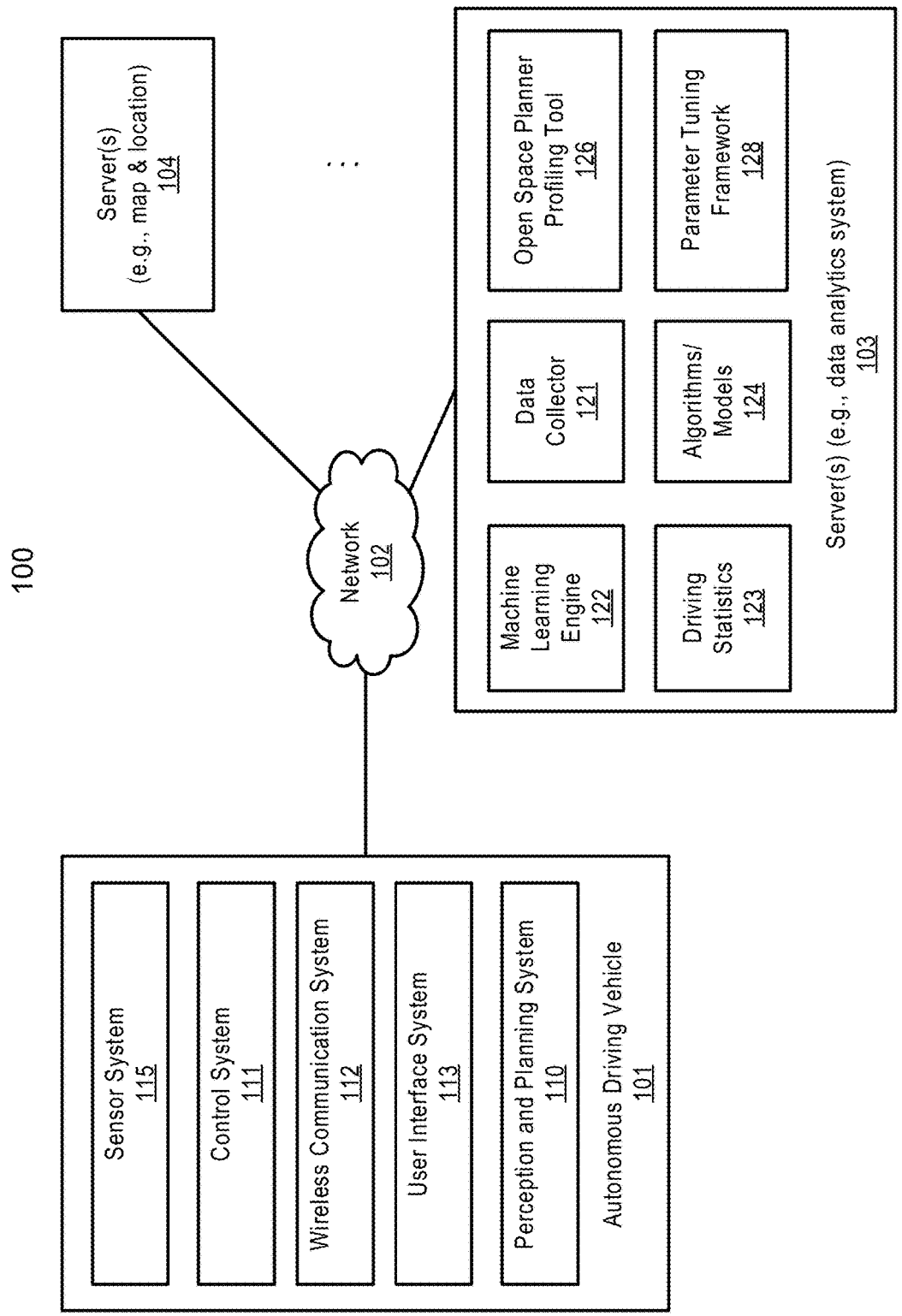
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, systems, methods, and media for evaluating an open space planner in an autonomous vehicle are disclosed. In one embodiment, an exemplary method includes receiving a configuration file specifying parameters of the ADV, and a record file recorded by the ADV while driving in an open space using an open space planner; extracting planning messages and prediction messages from the record file, each extracted message being associated with the open space planner. The method further includes generating features from the planning message and the prediction messages in view of the specified parameters of the ADV; and calculating statistical metrics from the features. The statistical metrics are then provided to an automatic tuning framework for tuning the open space planner.

In an embodiment, the statistical metrics can include a mean, a range, and a 95 percentile calculated from the plurality of features. The statistical metrics can be either displayed on a graphical user interface as visualization plots, and/or are sent to a user as an email report.

In an embodiment, extracting the planning messages and the prediction messages associated with the open space planner further comprises extracting planning messages and prediction messages from the record file; filtering out, from the planning messages, one or more planning messages that are not generated by the open space planner; filtering out, from the prediction messages, one or more prediction messages that are not related to the open space; and aligning the remaining planning messages and the remaining prediction messages based on their timestamps.

In one embodiment, the features can be extracted directly from the planning messages or calculated based on the extracted features in view of the parameters of the ADV. The features measures latency, controllability, safety, and comfort of trajectories generated by the ADV. The parameters of the vehicle specified in the configuration includes a steering ratio, a wheel base, and a maximum speed of the ADV.

The embodiments described above are not exhaustive of all aspects of the present invention. It is contemplated that the invention includes all embodiments that can be practiced from all suitable combinations of the various embodiments summarized above, and also those disclosed below.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
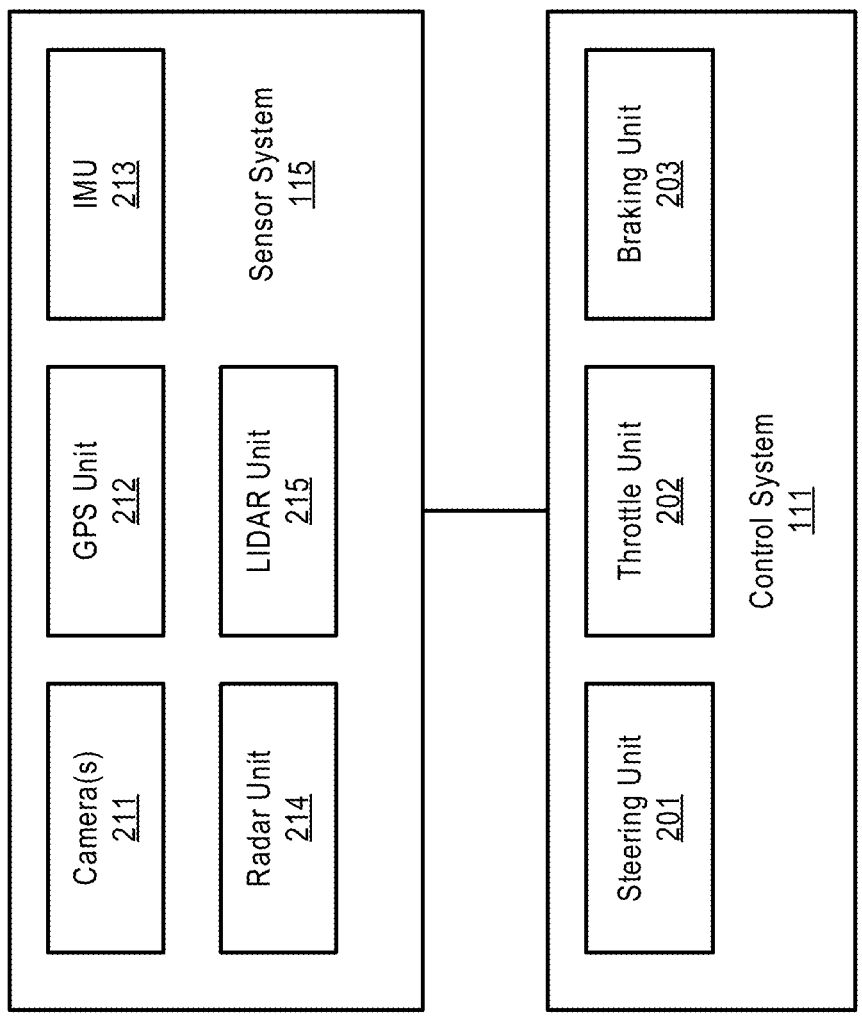
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Server 103 may also include an open space planner profiling tool 126 that can evaluate the performance of an open space planner in an ADV, and generate statistical performance metrics from a number of performance features extracted or calculated from record files of the ADV. The statistical performance metrics can be provided to a parameter tuning framework 128, which can use the statistical performance metrics to automatically and iteratively tune parameters of the open space planner.

Figure 3A:
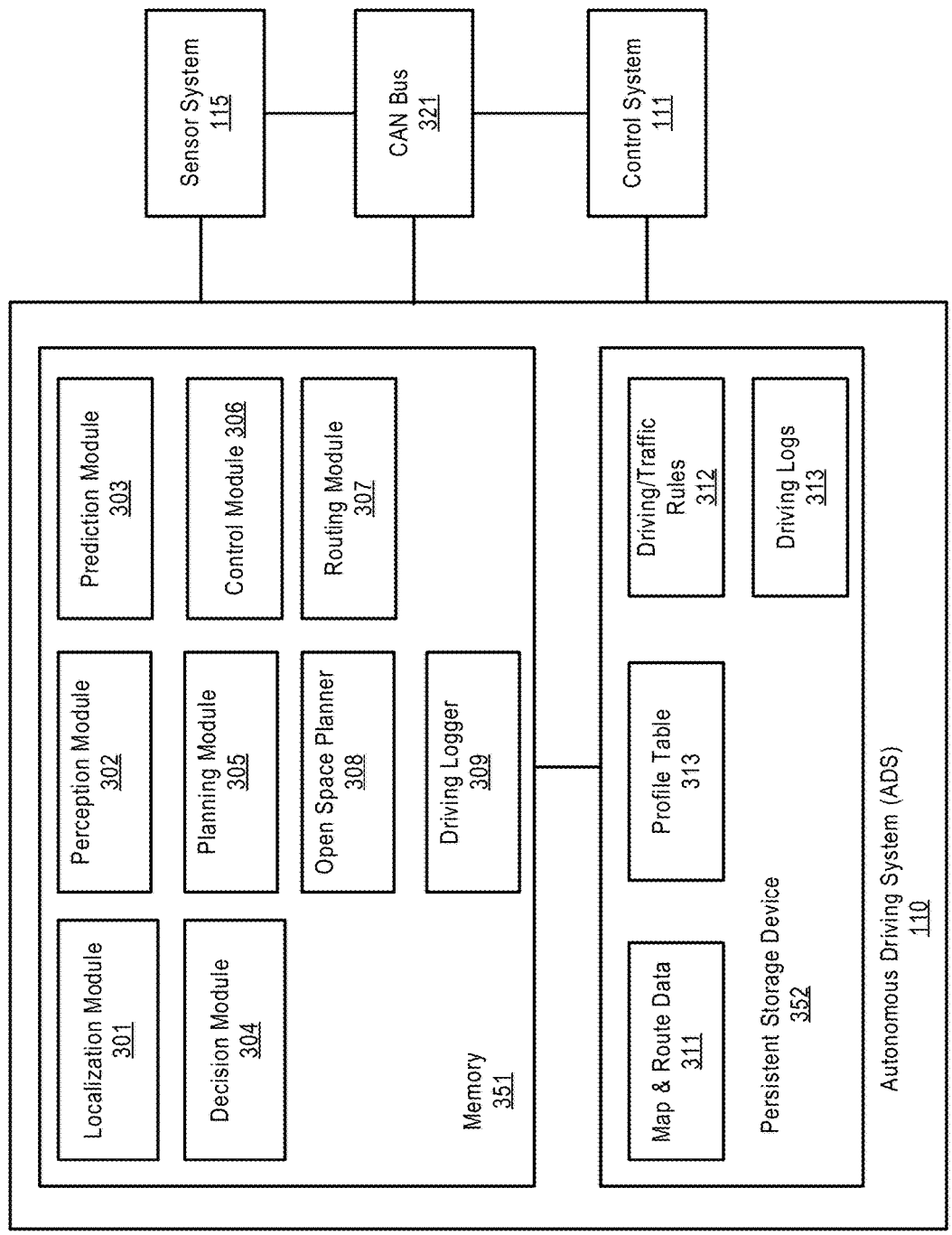
FIGS. 3A-3B are block diagrams illustrating an example of a perception and planning system used with an autonomous vehicle according to one embodiment.
Figure 3B:
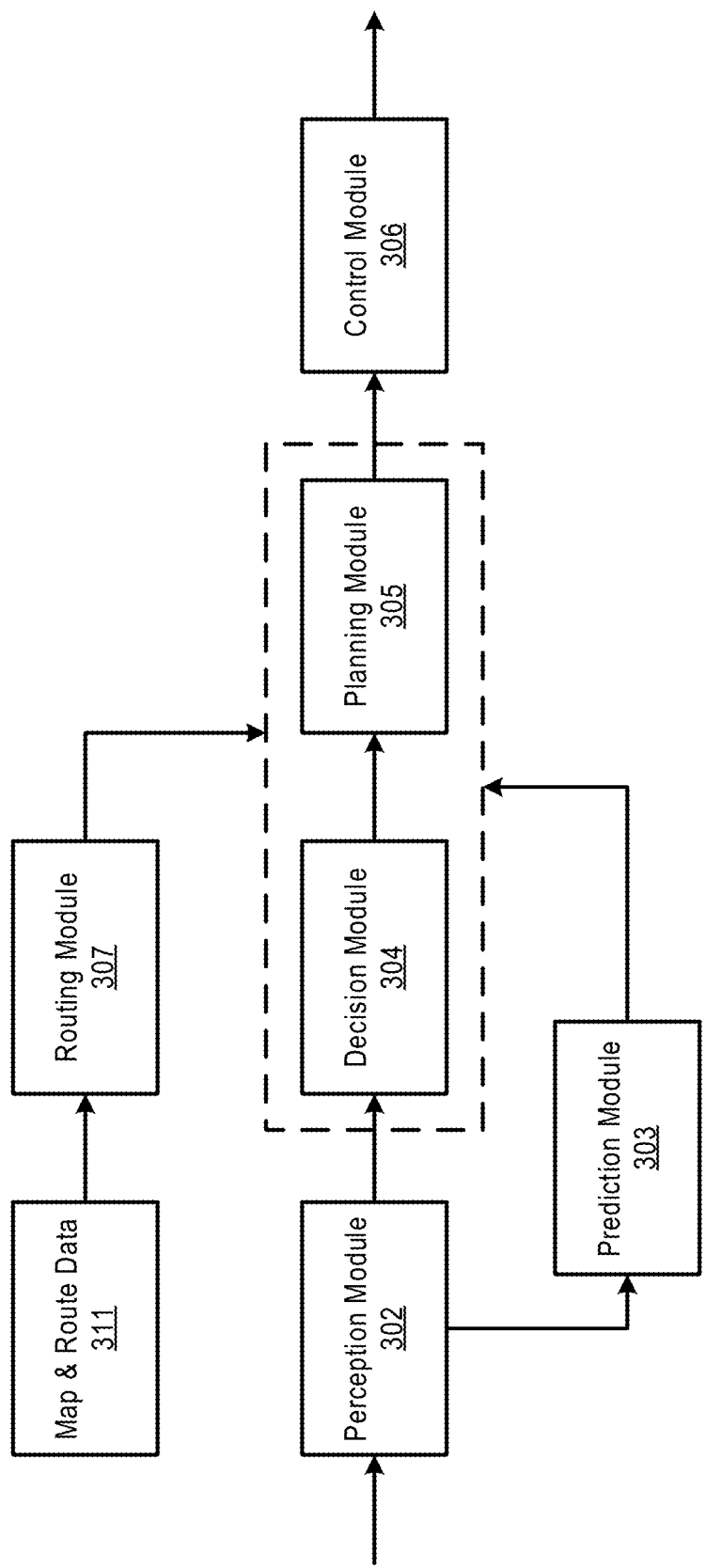

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307. routing module 307, open space planner 308, and driving logger 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route or trajectory for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111 via a CAN bus module 321, according to a trajectory (also referred to as a route or path) defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV 101. Open space planner 308 is described below with reference to FIG. 4.

Driving logger 309 records driving records from at least three data channels of the ADV control system: a control channel, a chassis channel, and a localization channel. The control channel produces information about control commands to control systems of the ADV, such as braking, throttle, and steering. The chassis channel produces information from various sensors, such as accelerometers, and readings of actual positions or actuations of the braking, throttle, and steering systems. The localization channel produces information regarding the actual location and heading of the ADV with reference to a standard reference such as a high-definition (HD) map or a global positioning satellite (GPS) system. Driving records can be recorded at approximately 100 frames per second (fps), or at about 10 milliseconds (ms) per frame. Each driving record has a timestamp. A timestamp can be an absolute timestamp in the form of hh:mm:ss:ms (hours, minutes, seconds, milliseconds) relative to a start time, such as the start of a driving route. In embodiment, the timestamp can be a frame number, relative to a start time such as the start of the driving route. In an embodiment, each driving record can additional have a date stamp in addition to the time stamp. Driving logger 309 can log driving records for simulated ADV driving sessions as well as real-world ADV driving sessions.

Driving logger 309 can write the driving records to a non-volatile storage such as driving logs storage 313. Driving logs 313 can be uploaded automatically or manually to a server system, e.g. server(s) 103-104, to generate a set of standardized performance metrics that grade the performance of one of more autonomous driving modules of the ADV.

Figure 4:
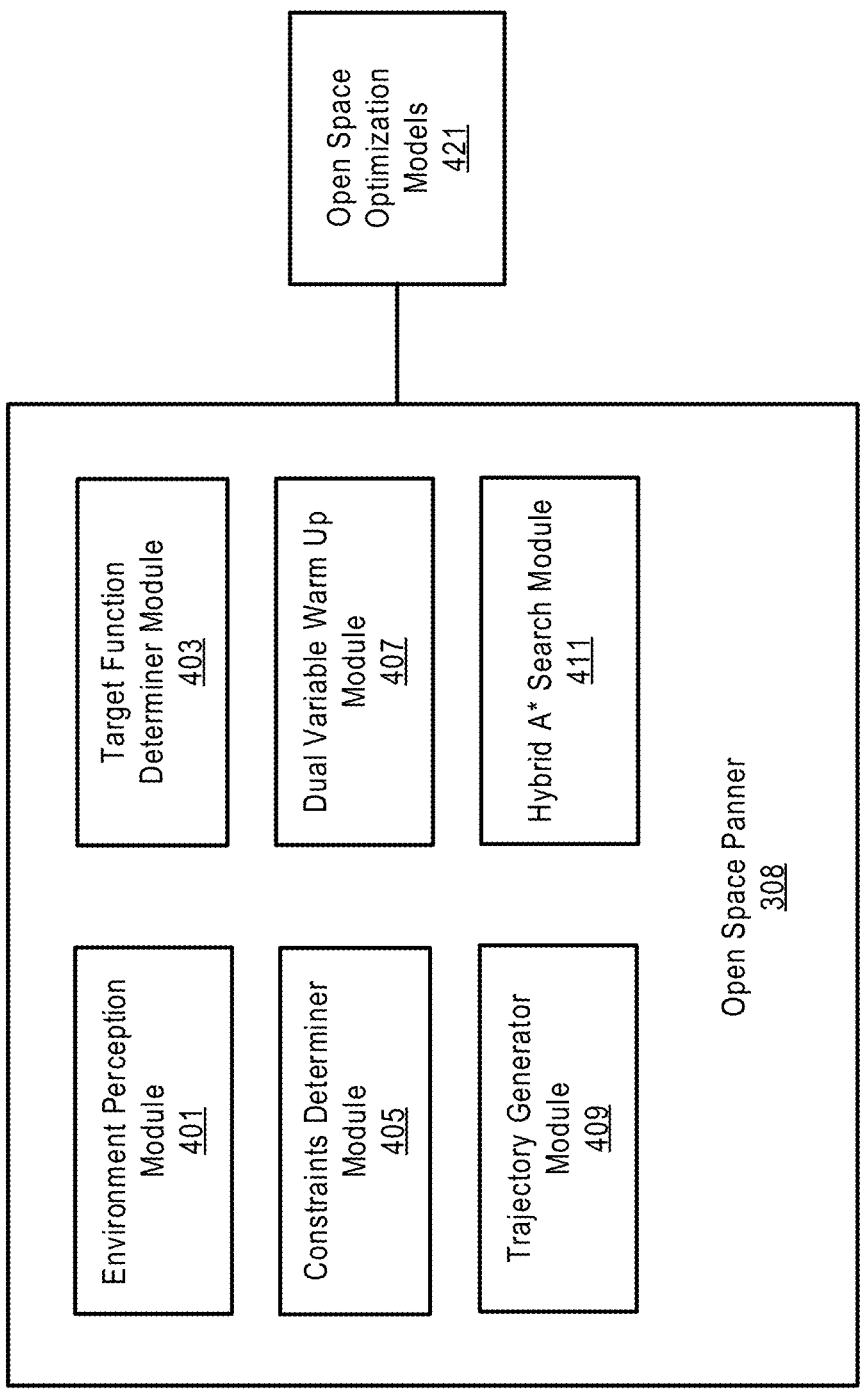
FIG. 4 is a block diagram illustrating an example of an open space planning module according to one embodiment.

FIG. 4 is a block diagram illustrating an example of an open space planning module according to one embodiment. Open space planner 308 can generate a trajectory for an ADV in an open space, where there is no reference lines or traffic lanes to be followed. Examples of an open space include a parking lot, or a roadway where a vehicle performs a parallel parking, a U-turn, or a three-point turn. Referring to FIG. 4, in one embodiment, open space planner 308 includes environment perception module 401, target function determiner module 403, constraints determiner module 405, dual variable warming up module 407, trajectory generator module 409, and hybrid A* search module 411. Environment perception module 401 can perceives an environment of the ADV. Target function determiner module 403 can determine a target function for an optimization model (e.g., open space optimization model 421 (as part of models 313 of FIG. 3A)) to optimize. Constraints determiner module 405 can determine constraints for the optimization model. Constraints can include inequality, equality, and bound constraints. Dual variable warming up module 407 can apply a quadratic programming (QP) solver to a target (objective) function to solve for one or more variables (such as dual/two variables) subject to some constraints, where the target function is a quadratic function. Trajectory generator module 409 can generate a trajectory based on the solved variables. Hybrid A* search module 411 can search for an initial trajectory (zig zag, non-smooth trajectory without consideration for observed obstacles) using a search algorithm, such as an A* search algorithm, or a hybrid A* search algorithm.

Open Space Planner Tuning

Figure 5:
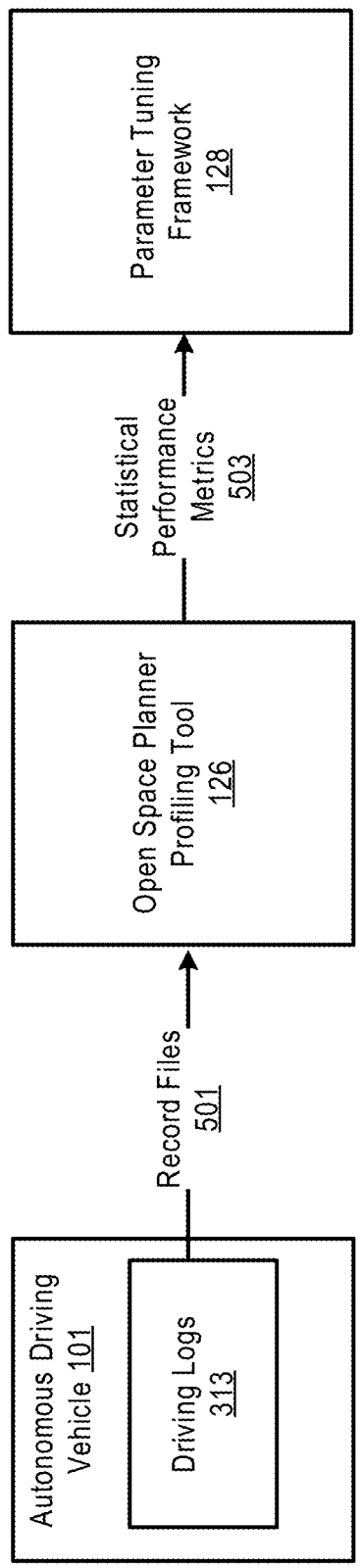
FIG. 5 is a high-level flow diagram illustrating a progress of tuning parameters of an open space planner in accordance with an embodiment.

FIG. 5 is a high-level flow diagram illustrating a progress of tuning parameters of an open space planner in accordance with an embodiment.

As shown in FIG. 5, record files 501 generated by the ADV 101 can be uploaded to the open space planner profiling tool 126, which can be a cloud application running the server 104. The open space planner profiling tool 126 can generate statistical metrics from the record files 501, and provide the statistical metrics 501 to the parameter tuning framework 128, which can use the statistical metrics to automatically tune the parameters of the open space planner 308 in the ADV 101. Record files 501 can contain driving records that recorded by driving logger 309 and stored in driving logs storage 313. In one embodiment, a record file can include outputs of some of the autonomous driving modules 301-309 (e.g., prediction module 303, planning module 305, and control module 306) for each frame during simulations or road tests.

Figure 6:
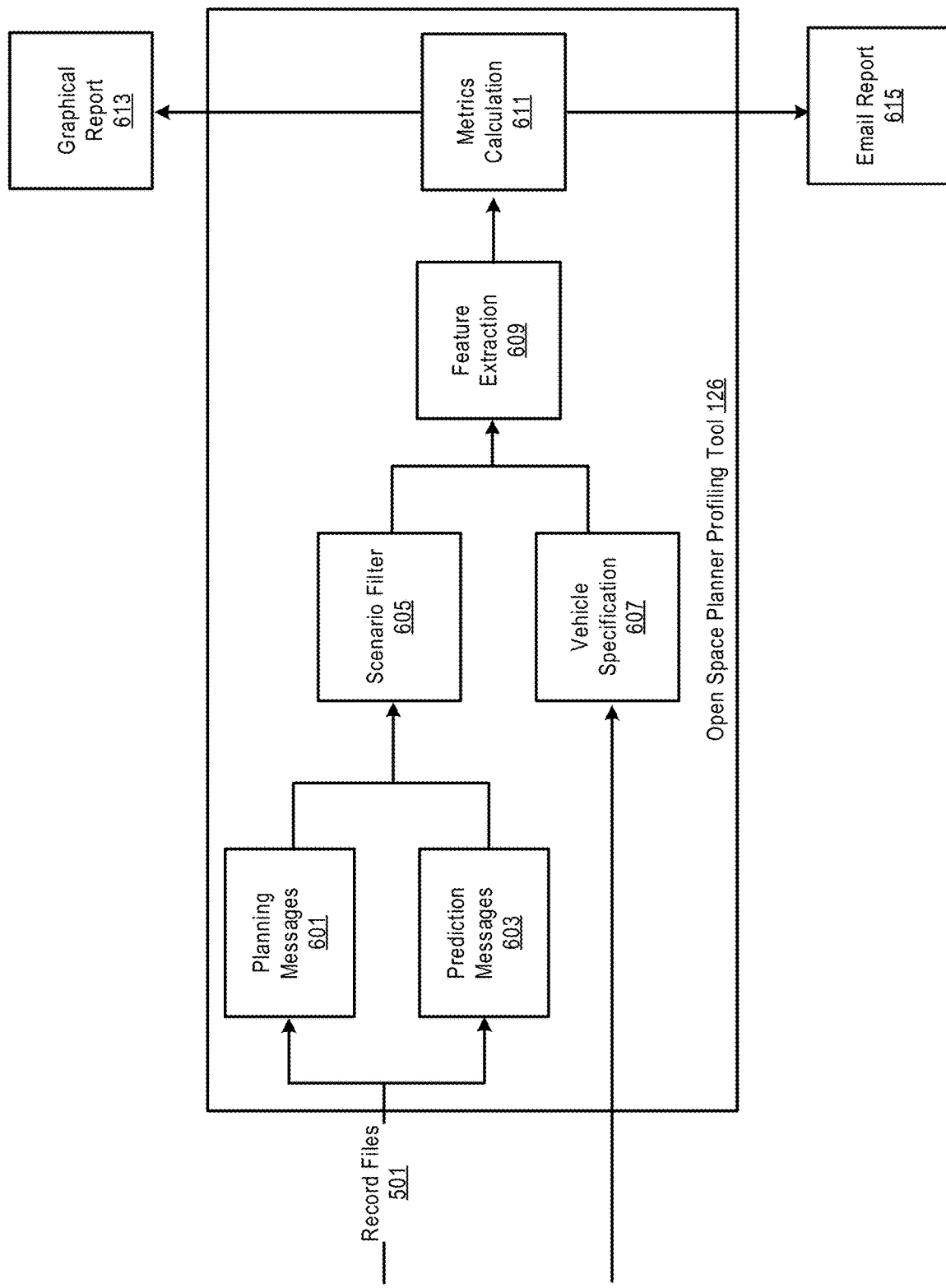
FIG. 6 is a system for evaluating the performance of the open space planner in accordance with an embodiment.

FIG. 6 is a system for evaluating the performance of the open space planner in accordance with an embodiment. More specifically, FIG. 6 illustrates how statistical performance metrics specific to the open space planner are generated by the open space planner profiling tool 126.

In one embodiment, the open space planner profiling tool 126 can work with both a simulation service (e.g., Baidu™ Apollo simulation service), and various data services (e.g., calibration service). The simulation service can be an open service that simulates autonomous vehicles driving in a virtual environment, can generate a record file in Apollo-specific format, and pass it to the open space profiling tool 126 for evaluation. The statistical performance metrics calculated by the tool 126 can be stored in the simulation service for data visualization and analysis on a website.

The data services can be cloud services (e.g., vehicle calibration service) based on user-specific road-test data. In this cloud pipeline, the open space planner profiling tool 126 can be used to evaluate large amounts of road-test data uploaded by users.

In one embodiment, the open space planner profiling tool 126 can directly receive record files recorded by a driving logger (e.g., the driving logger 309) from an autonomous driving vehicle, together with specifications of the vehicle that generates the record files. The open space planner profiling tool 126 can also include a number of standard interfaces, allowing users to upload various information as inputs to the open space planner tool 126.

For example, the open space planner profiling tool 126 can have an interface allowing users to upload their own road-test data, and an interface that allows users to provide the specifications of the vehicle that generates the road-test data. Examples of the vehicle specifications can include types of an autonomous vehicle (e.g., a make, model, revision number of the vehicle), a steering ratio, a wheel base, and a maximum speed. In an embodiment, the record files can be in a particular format, such as Baidu™ Apollo data format.

As further shown, the open space planner profiling tool 126 can extract planning messages 601 and prediction messages 603 from the record files 501. As used herein, a message is a real-time output of a corresponding module while the module is in operation in driving an autonomous driving vehicle.

For example, a planning message can be generated by a planning module for each frame (e.g., at each 100 ms), and can include a planned path for a following time interval (e.g., the next 2 seconds). A prediction message can be generated by a prediction module, and can include information such as a desired speed of the vehicle at different points on the planned path, and a curvature at each point. A control message can be generated by a control module, and can include commands for throttling, braking, and steering commands.

The planning messages 601 and prediction messages 603 can be passed to a scenario filter 605, which is to filter out messages that are not related to the open space planner or the open space. The open space planner profiling tool 126 can also align planning messages and prediction messages that that have passed the scenario filter 605 based on their timestamps. In one embodiment, each planning message can be paired with a corresponding prediction message. Each pair of planning message and prediction message can be passed to a feature extraction component 609, together with user-provided vehicle specification information.

The feature extraction component 609 can obtain relevant features such as curvatures of points and/or trajectory curvatures on the planned paths, accelerations, minimum distances to obstacle. These features can be directly extracted from the planning messages and prediction messages that have passed the scenario filter 609 or calculated based on those messages in view of the vehicle specification information (e.g., parameters of the vehicle).

In one embodiment, the features extracted or calculated can be in the following four areas: latency, controllability, safety and comfort. The latency can be measured by how long it takes for the open space planner to generate a planned path, and comfort can be measured by lateral and longitudinal acceleration and jerks. Additional details about the features are provided in FIG. 7.

The features can be provided to the metrics calculation component 611, which can calculate statistical metrics from the features, such as a mean, a 95% percentile based on the features.

A graphical report 613 can be generated for reporting purposes. The graphical report 613 can include various visualizations plots. Further, an email report 615 with a profiling summary and one or more text tables can also be generated and sent to the users.

FIG. 7 illustrates selected features in each of the four areas according to one embodiment. As shown in FIG. 7, in the area of latency 701, the features can include a chosen trajectory latency, a zig-zag trajectory latency, and a stage completed time. In the area of controllability 703, the features can include non-gear-switch trajectory length ratio, an initial heading difference ratio, a normalized curvature ration, a curvature changing rate ratio, an acceleration ratio, a deceleration ratio, and a longitudinal jerk ratio. In the area of comfort 705, the features can include a longitudinal jerk ratio, lateral jerk ratio, a longitudinal acceleration ratio, and a lateral acceleration ratio, a longitudinal deceleration ratio, a lateral deceleration ration, a distance to boundaries ratio, a distance to obstacle ratio, and a time to collision ratio. In the area of safety 707, the features can include a distance to obstacle ratios, and a time to collision ratio. The above features are provided as the purpose of illustration. Different features or additional features can be extracted and calculated for each of the above four areas.

Figure 8A:
FIGS. 8A-8B are an example of a graphical report and an example of an email report in accordance with an embodiment.
Figure 8B:
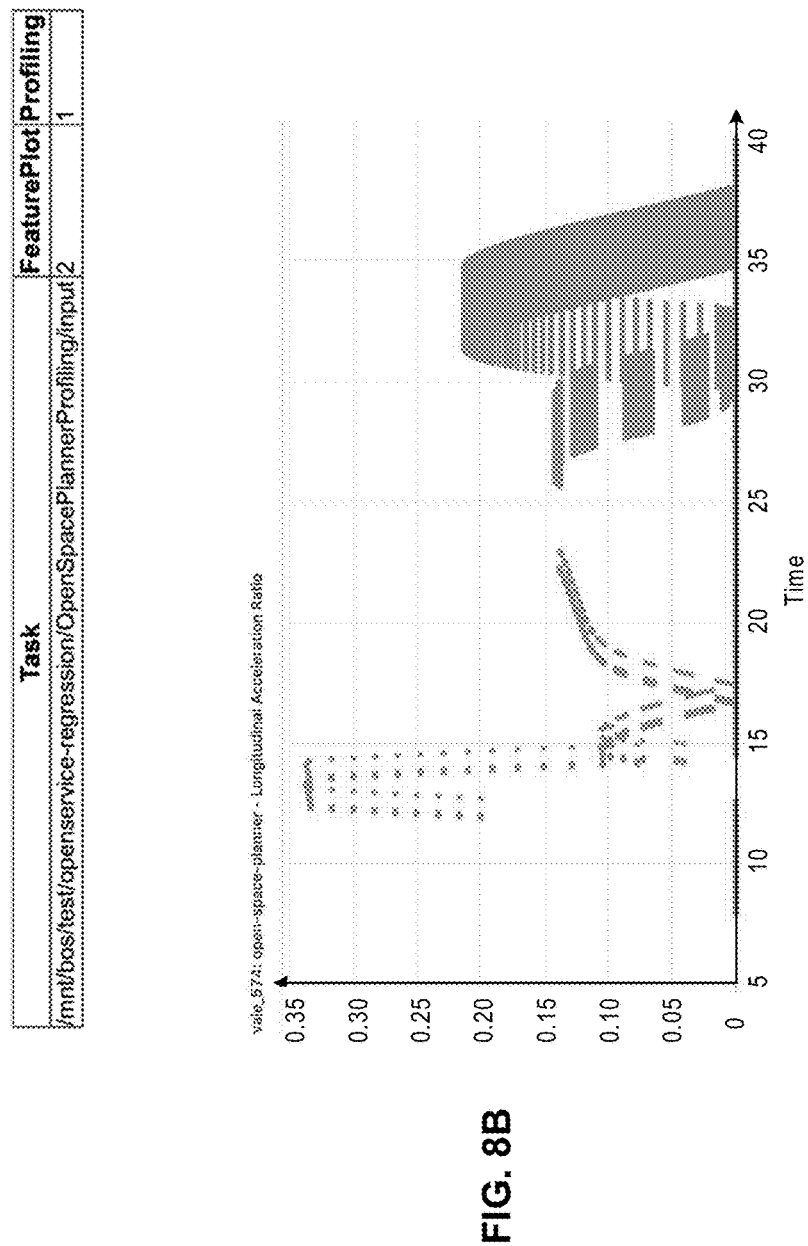

FIGS. 8A-8B are an example of a graphical report and an example of an email report in accordance with an embodiment.

FIG. 8A is an example of an email report. As shown, the email report can be sent to an email of a user, and can include a profiling result in a tabular form. FIG. 8B is an example of a graphical report for the longitudinal acceleration ratio, and shows how the ratio changes over time.

As described above, the statistical performance metrics can be provided to the parameter tuning framework 128, which can use the statistical performance metrics to automatically tune the parameters using the configuration of the open space planner.

Figure 9:
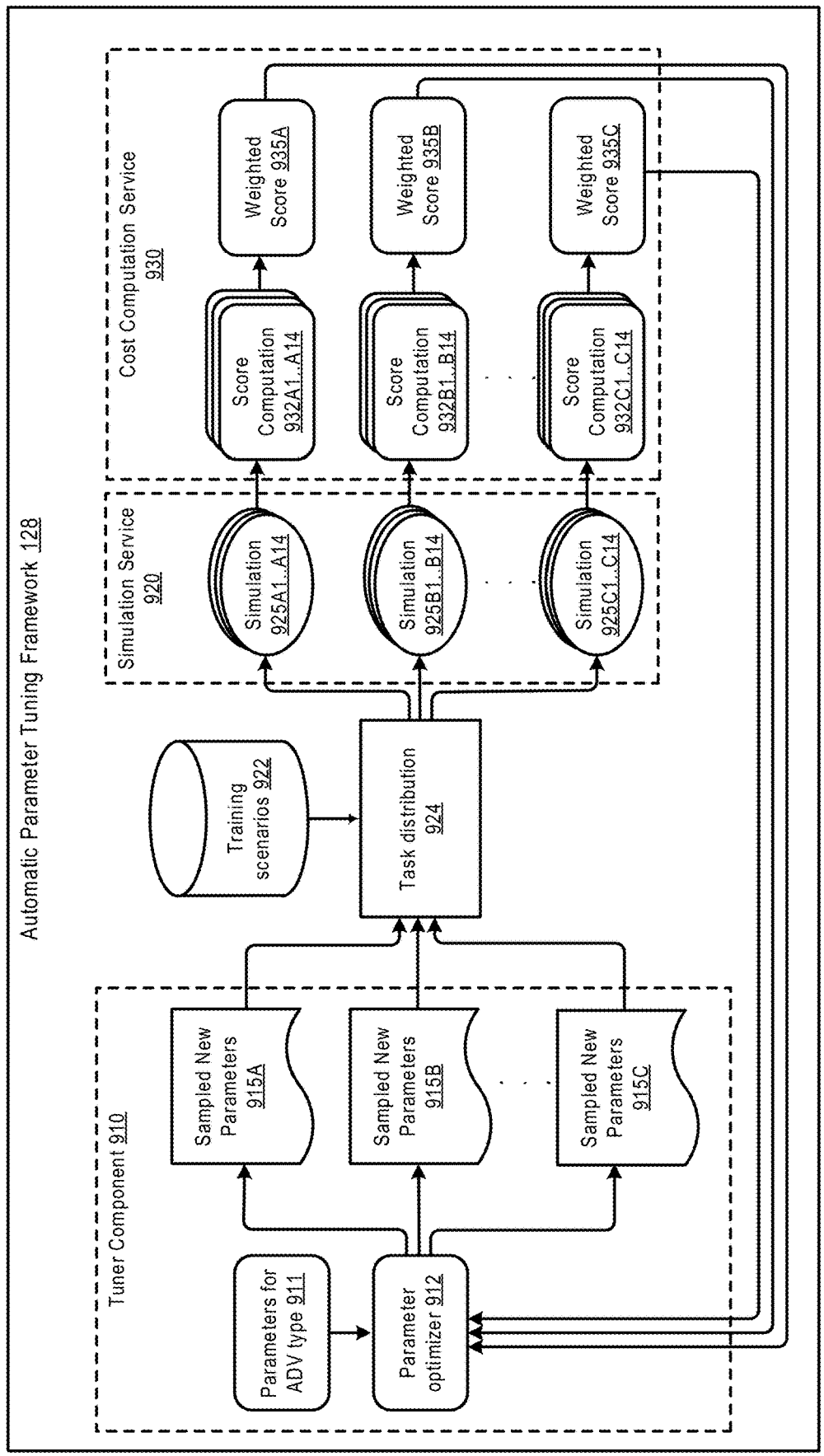
FIG. 9 is a block diagram illustrating a process flow of an automatic parameter tuning framework for controllers used in autonomous driving vehicles, according to cone embodiment.

FIG. 9 is a block diagram illustrating a process flow of an automatic parameter tuning framework for an open space planner in an ADV according to one embodiment.

Server 104 can include an ADV driving simulator, which can simulate actual driving of an ADV. Parameters for ADV type 911 can include a listing of tunable parameters for a type of ADV, e.g. a compact ADV, a truck, or a van. The types of the ADVs can be simulated in the driving simulator.

The automatic parameter tuning framework 900 includes a tuner component 910, a simulation service 920, and a cost computation service 930. To achieve high efficiency, the tuner component 910 supports a parallel evaluation process by spawning multiple worker threads to sample different sets of parameter values, for a selected ADV type, at the same time. The sampling method can be customized based upon a parameter optimizer 912 and a sampling policy. The parameter optimizer 912 can be a Bayesian Global Optimizer, which can utilize multiple probability models for approximating the objective functions, e.g., Gaussian Process Regress (GPR) and Tree-structured Parzen Estimator (TPE).

The parameters to be sampled by the tuner component 910 are described in FIG. 7. The statistical performance metrics calculated by the open space planner profiling tool 126 (e.g., a mean, a 95 percentile, and a range in values of each parameter/feature) can be used in the selection of pertinent parameters values to improve tuning efficiency.

For example, if the range of values for a parameter, e.g., trajectory latency, is within a particular range, the tuner component 910 would not select values for the parameter that is not in the particular range when generating the multiple sets of parameters 915.

Each set of the sets of parameters 915 can be combined with a pre-selected set of training scenarios 922 to generate tasks, each of which is a unique combination of one set of parameter values 915 and one training scenario 922.

A task distribution 924 logic can manage the tasks, and sends requests to the simulation service 920 to execute the tasks. Since the tasks are independent of each other, another round of efficiency boost is accomplished in the simulation service 920 by running all tasks in parallel and returning the execution records to the cost computation service 930 separately.

Upon receipt of each execution record, the cost computation service 930 calculates a score 920 for the task. A weighted average score 935 is also obtained for the specific set of parameter values 915 across all training scenarios 922. The average score is fed back to the tuner component 910 for optimization in a next iteration by parameter optimizer 912.

In an embodiment, for each tunable parameter in a set of sampled new parameters 915, parameter optimizer 912 selects an initial ("first") value. The initial value for each tunable parameter 915 can be randomly selected within a value range space for the tunable parameter. The performance metrics calculated by the open space planner profiling tool 126 can include such a value range.

The parameter optimizer 912 iterates the data flow for a predetermined fixed number of times. Each iteration produces a single weighted score 935 that is used as an objective by parameter optimizer 912 to modify the sampled parameters 915 for a next iteration of the optimizer. When the fixed number of iterations have been performed, the parameter optimizer 912 determines the optimal value for each tunable parameter in the plurality of tunable parameters 915. In subsequent iterations, parameter optimizer 912 can modify the values of the plurality of tunable parameters at each iteration of the optimization operations described herein. In an embodiment, parameter optimizer 912 can use the weighted score 935 to modify the values of the plurality of tunable parameters for a next iteration of the parameter optimizer 912.

Parameter optimizer 912 can be configured to optimize a predetermined fixed number of sets of tunable parameters 915 (also termed, "sampled new parameters 915"), such as sets of sampled new parameters 915A . . . 915C. Each set of sampled new parameters 915A . . . 915C can be optimized simultaneously, in parallel, and independently from one another. Optimization can include repeating the optimization process of FIG. 9 a predetermined fixed number of times. The predetermined fixed number of optimizer iterations for each of the sampled new parameters 915A . . . 915C can be the same number of optimizer iterations, such that when each set of sampled new parameters 915A . . . 915C complete their fixed number of optimization iterations, the parameter optimizer 912 can select a best one set of the sampled new parameters 915A . . . 915C using the weighted score 935A . . . 935C of each set of the sampled new parameters 915A . . . 915C at the completion of the fixed number of iterations.

The cost computation service 930 can include a database of training scenarios 922. Training scenarios 922 can include several thousand different driving scenarios. In an embodiment, the plurality of driving scenarios in an open space, e.g., a left turn at low speed in a parking lot, and a right turn at low speed in the parking lot.

The task distribution 924 manages and schedules the simulations 925A . . . 925C for each of a set of selected driving scenarios 922 for each of the sets of sampled new parameters 915A . . . 915C. For example, if there are 3 sets of sampled new parameters, and 10 selected driving scenarios, the total of numbers of scheduled simulations can be 40.

For each of the 40 simulations, the simulation service 920 can perform a simulation task 925, which can include simultaneous operations on multiple threads. For each simulation task, the cost computation service 930 can generate a score 932 measuring the performance of the ADV simulation 925 in light of the performance metrics described in FIG. 7. Thus, for sampled new parameter set 915A, the cost computation service 930 can provide a score computation for each of the simulations 925A1 . . . 925A14, with scores 932A1 . . . 932A14. The cost computation service 930 can also provide a single weighted score 935A representing performance of the ADV using values of the set of sampled new parameters 915A of the simulated ADV for all the 40 simulations.

In an embodiment, the weights used to generate the weighted score 935 reflect higher, or lower, relative importance of certain metrics in the plurality of metrics used to generate a score computation 932. For example, a station endpoint error of the driving scenario may be weighted higher than an average speed error. Safety errors may be weighted higher than passenger comfort errors, passenger comfort errors may be weighted higher than frequency of usage of the controls, such as braking, steering, or throttle.

The cost computation service 930 provides weighted scores 935A . . . 935C to parameter optimizer 912, which can use the weighted score 935A to modify the sampled new parameters 915A for a next iteration ("repetition") of the optimizer to find optimal values for the sampled new parameters 915A. Similarly, parameter optimizer 912 can use weighted score 935B to modify the sampled new parameters 915B for a next iteration of the optimizer to find optimal values for the sampled new parameters 915B. Additionally, parameter optimizer 912 can use weighted score 935C to modify the sampled new parameters 915C for a next iteration of the parameter optimizer 912 to find optimized values for the sampled new parameters 915C.

In an embodiment, at the end of a configurable, predetermined fixed number of iterations of the parameter optimizer 912, a best set of new sampled parameters 915 can be selected from the three (3) sets of sampled new parameters 915A . . . 915C, and the best set of sampled new parameters 915 can be downloaded to a physical, real-world ADV having the ADV type for the sampled new parameters 915A . . . 915C, to navigate the ADV having the ADV type. In an embodiment, each of sampled new parameters 915A . . . 915C can be for a different ADV type. At the completion of the fixed number of iterations of the parameter optimizer 912, each set of sampled new parameters is optimized. Each of the optimized sample new parameter sets 915A . . . 915C can be downloaded to a physical, real-world ADV of the ADV type for the sample new parameter set, and each ADV of the physical real-world ADVs can be navigated using the values of the optimized set of sampled new parameters for the ADV type.

For each set of sampled new parameters 915, a best set of values for the sampled new parameter set can be one or more of: (1) the values of the parameters in the set of sampled new parameters 915 at the end of the fixed number of iterations of the parameter optimizer 912, (2) the values of the set of parameters in the sampled new parameters 915 at the end of the fixed number of iterations, as would be modified by the parameter optimizer 912 if there were to be one or more iteration of the parameter optimizer 912, or (3) the values of the set of sampled new parameters 915 after an iteration of the parameter optimizer 912, if the difference between the weighted score 935 of the current iteration is less than the weighted score 935 of a preceding iteration of the parameter optimizer 912 by a predetermined threshold amount. In an embodiment wherein the sampled new parameter sets 915A . . . 915C all relate to a same type of ADV, then the best values among sampled new parameter sets 915A . . . 915C can be the sampled new parameter set 915 having the best weighted score 935 after the end of optimizing each of the sampled new parameter sets 915A . . . 915C.

Figure 10:
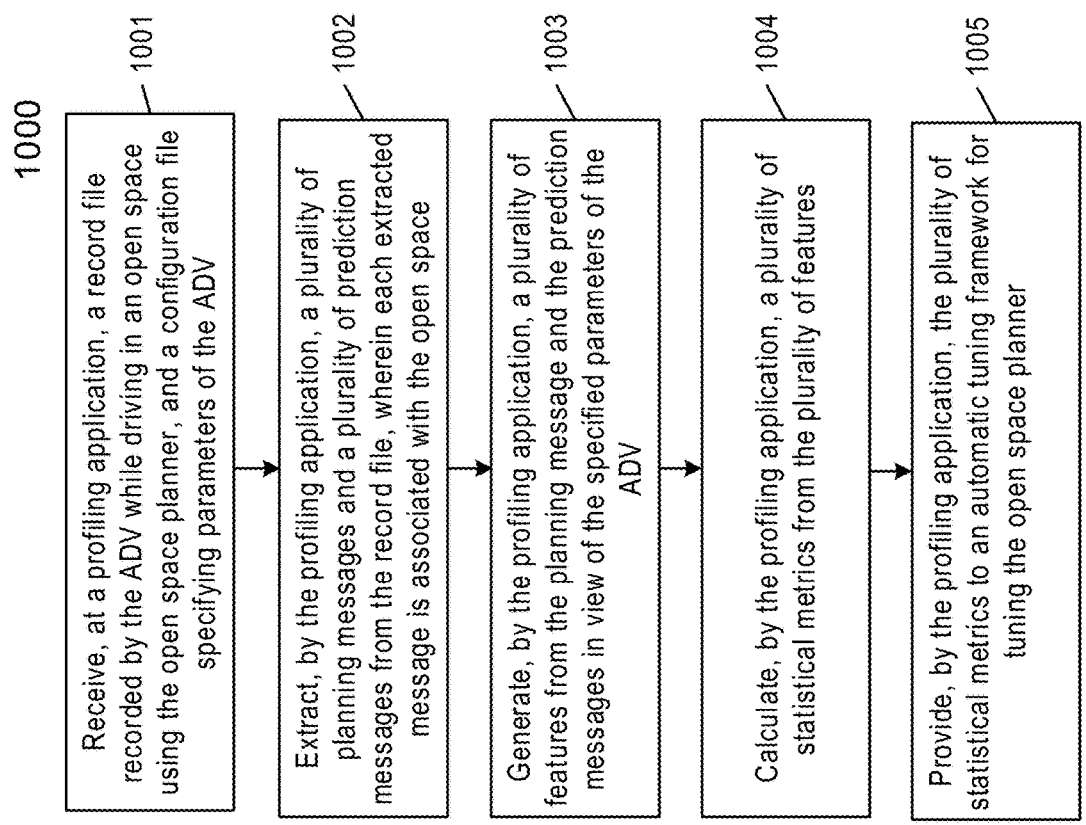
FIG. 10 is a flow chart illustrating a process of evaluating the performance of an open space planner in an ADV in accordance with an embodiment

FIG. 10 is a flow chart illustrating a process 1000 of evaluating the performance of an open space planner in an ADV in accordance with an embodiment. Process 1000 may be performed by processing logic which may include software, hardware, or a combination thereof. For example, process 1000 may be performed by the open space planner profiling tool 126 described in FIG. 1 and FIG. 6.

As shown in FIG. 10, in operation 1001, the processing logic receives a record file recorded by the ADV while driving in an open space using the open space planner, and a configuration file specifying parameters of the ADV. In operation 1002, the processing logic extracts a plurality of planning messages and a plurality of prediction messages from the record file, wherein each extracted message is associated with the open space planner. In operation 1003, the processing logic generates a plurality of features from the planning message and the prediction messages in view of the specified parameters of the ADV. In operation 1004, the processing logic calculates a plurality of statistical metrics from the plurality of features. In operation 1005, the processing logic provides the plurality of statistical metrics to an automatic tuning framework for tuning the open space planner.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of evaluating an open space planner of an autonomous driving vehicle (ADV), the method comprising:
receiving, at a profiling application executed by a processor, a record file and a configuration file specifying parameters of the ADV, the record file having prior driving records recorded by the ADV while driving in an open space using the open space planner;
extracting, by the profiling application, a plurality of planning messages and a plurality of prediction messages from the record file, wherein each extracted message is associated with the open space planner;
generating, by the profiling application, a plurality of features from the planning messages and the prediction messages in view of the specified parameters of the ADV, wherein the plurality of features measure latency, controllability, safety, and comfort of trajectories generated by the ADV;
calculating, by the profiling application, a plurality of statistical metrics from the plurality of features; and
providing, by the profiling application, the plurality of statistical metrics to an automatic tuning framework for tuning the open space planner.

2. The method of claim 1, wherein extracting the plurality of planning messages and the plurality of prediction messages associated with the open space planner further comprises:
extracting, from the record file, each message in the record file, wherein the record file includes at least one message in addition to the plurality of planning messages associated with the open space planner and the plurality of prediction messages associated with the open space planner;
filtering out the at least one message based on a determination the at least one message is unrelated to the open space planner; and
aligning the plurality of planning messages and the plurality of prediction messages based on timestamps included in each of the plurality of planning messages and each of the plurality of prediction messages.

3. The method of claim 1, wherein the profiling application is configured to run either on the ADV or on a cloud server.

4. The method of claim 1, wherein generating the plurality of features includes extracting one or more of the plurality of features from the plurality of planning messages, and calculating one or more of the plurality of features based on the one or more extracted features and the parameters of the ADV.

5. The method of claim 1, wherein the parameters of the ADV specified in the configuration file includes a steering ratio, a wheel base, and a maximum speed of the ADV.

6. The method of claim 1, wherein the statistical metrics include a mean, and a 95 percentile calculated from the plurality of features.

7. The method of claim 1, wherein the statistical metrics are displayed on a graphical user interface as visualization plots, and are sent to a user as an email report.

8. A non-transitory machine-readable medium having instructions stored therein, which when executed by a processor, cause the processor to perform operations of evaluating an open space planner of an autonomous driving vehicle (ADV), the operations comprising:
receiving a record file and a configuration file specifying parameters of the ADV, the record file having prior driving records recorded by the ADV while driving in an open space using the open space planner;
extracting a plurality of planning messages and a plurality of prediction messages from the record file, wherein each extracted message is associated with the open space planner;
generating a plurality of features from the planning messages and the prediction messages in view of the specified parameters of the ADV, wherein the plurality of features measure latency, controllability, safety, and comfort of trajectories generated by the ADV;
calculating a plurality of statistical metrics from the plurality of features; and
providing the plurality of statistical metrics to an automatic tuning framework for tuning the open space planner.

9. The non-transitory machine-readable medium of claim 8, wherein extracting the plurality of planning messages and the plurality of prediction messages further comprises:
extracting, from the record file, each message in the record file, wherein the record file includes at least one message in addition to the plurality of planning messages associated with the open space planner and the plurality of prediction messages associated with the open space planner;
filtering out the at least one message based on a determination that the at least one message is unrelated to the open space planner; and
aligning the plurality of planning messages and the plurality of prediction messages based on timestamps included in each of the plurality of planning messages and each of the plurality of prediction messages.

10. The non-transitory machine-readable medium of claim 8, wherein the statistical metrics are displayed on a graphical user interface as visualization plots, and are sent to a user as an email report.

11. The non-transitory machine-readable medium of claim 8, wherein generating the plurality of features includes extracting one or more of the plurality of features from the plurality of planning messages, and calculating one or more of the plurality of features based on the one or more extracted features and the parameters of the ADV.

12. The non-transitory machine-readable medium of claim 8, wherein the parameters of the ADV specified in the configuration file includes a steering ratio, a wheel base, and a maximum speed of the ADV.

13. The non-transitory machine-readable medium of claim 8, wherein the statistical metrics include a mean, and a 95 percentile calculated from the plurality of features.

14. A data processing system, comprising:
  a processor; and
  a memory coupled to the processor to store instructions, which when executed by the processor, cause the processor to perform operations of evaluating an open space planner of an autonomous driving vehicle (ADV), the operations comprising:
    receiving a record file and a configuration file specifying parameters of the ADV, the record file having prior driving records recorded by the ADV while driving in an open space using the open space planner;
    extracting plurality of planning messages and a plurality of prediction messages from the record file, wherein each extracted message is associated with the open space planner;
    generating a plurality of features from the planning messages and the prediction messages in view of the specified parameters of the ADV, wherein the plurality of features measure latency, controllability, safety, and comfort of trajectories generated by the ADV;
    calculating a plurality of statistical metrics from the plurality of features; and
    providing plurality of statistical metrics to an automatic tuning framework for tuning the open space planner.

15. The data processing system of claim 14, wherein the statistical metrics are displayed on a graphical user interface as visualization plots, and are sent to a user as an email report.

16. The data processing system of claim 14, wherein the profiling application is configured to run either on the ADV or on a cloud server.

17. The data processing system of claim 14, wherein extracting the plurality of planning messages and the plurality of prediction messages further comprises:
  extracting, from the record file, each message in the record file, wherein the record file includes at least one message in addition to the plurality of planning messages associated with the open space planner and the plurality of prediction messages associated with the open space planner;
  filtering out the at least one message based on a determination that the at least one message is unrelated to the open space planner; and
  aligning the plurality of planning messages and the plurality of prediction messages based on timestamps included in each of the plurality of planning messages and each of the plurality of prediction messages.

18. The data processing system of claim 14, wherein the statistical metrics include a mean, and a 95 percentile calculated from the plurality of features.

19. The data processing system of claim 14, wherein generating the plurality of features includes extracting one or more of the plurality of features from the plurality of planning messages, and calculating one or more of the plurality of features based on the one or more extracted features and the parameters of the ADV.

20. The data processing system of claim 14, wherein the parameters of the vehicle specified in the configuration file includes a steering ratio, a wheel base, and a maximum speed of the ADV.

* * * * *